L. W. CHUBB.
HARMONIC ANALYZER.
APPLICATION FILED DEC. 31, 1913. RENEWED JUNE 28, 1916.
1,323,349.
Patented Dec. 2, 1919.
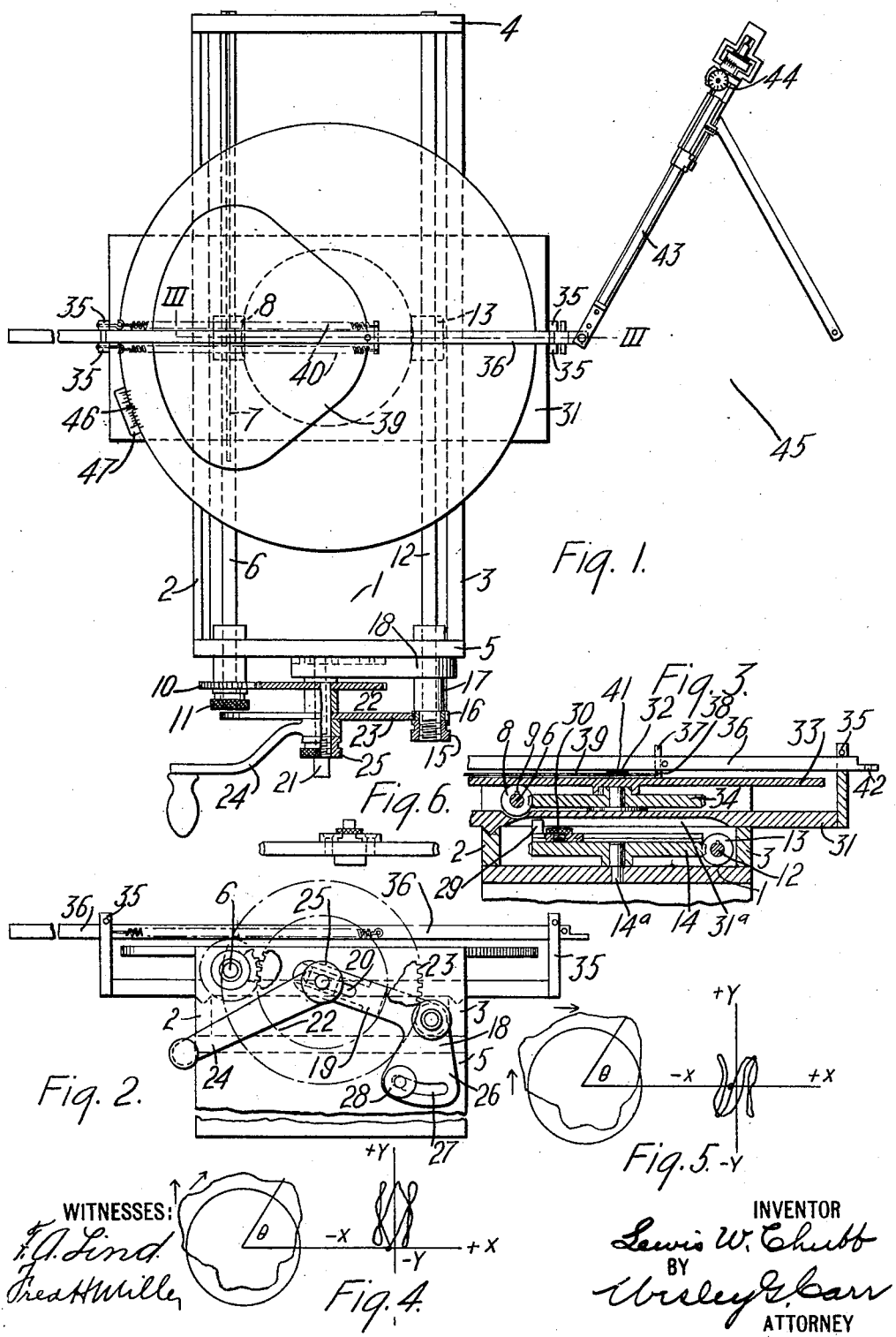

UNITED STATES PATENT OFFICE.

LEWIS W. CHUBB, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

HARMONIC ANALYZER.

1,323,349.  Specification of Letters Patent.  Patented Dec. 2, 1919.

Application filed December 31, 1913, Serial No. 809,794. Renewed June 28, 1916. Serial No. 106,519.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Harmonic Analyzers, of which the following is a specification.

My invention relates to harmonic analyzers and particularly to types of the same for analyzing composite curves having circular or polar coördinates.

The object of my invention is to provide a harmonic analyzer for mechanically determining the amplitude of the sine and cosine components of any harmonic component of a periodic function.

Heretofore, several types of harmonic analyzers have been provided but these were all adapted to analyze curves plotted in rectangular coördinates and they depended in most cases upon friction or the extension of springs for the force by which they were operated. My invention has many advantages by reason of the fact that it is adapted to analyze curves plotted in polar or circular coördinates, and it operates positively from gear wheels and other mechanical devices so that there is a great saving of time, and greater accuracy is assured. My copending application, Serial No. 809,795, describes a method of producing oscillographic waves having polar or circular coördinates which may be used in my present invention, as hereinafter described.

Figure 1 of the accompanying drawings is a view, partially in plan and partially in section, of a harmonic analyzer embodying my invention, Fig. 2 is a front elevational view of the harmonic analyzer shown in Fig. 1, Fig. 3 is a sectional view taken along the line III—III of Fig. 1, Figs. 4 and 5 are diagrammatic views of a harmonic analyzer and the curves described when the same is operated, and Fig. 6 is a detail view of parts of my invention.

Referring to the drawings, I provide a base member 1, two guide rails 2 and 3, and two end plates 4 and 5 forming a rectangular receptacle, substantially as shown. A rotatable shaft 6, having a relatively long keyway 7 cut therein, is supported between the end plates 4 and 5 and is provided with a worm screw 8 having a pin 9 that slides in the keyway 7, to allow of a rectilinear motion, as hereinafter explained. One end of the shaft 6 is screw-threaded to receive a nut 11 for holding a gear wheel 10 in place. A second rotatable shaft 12 is also supported between the end plates 4 and 5 and has securely keyed thereto a worm screw 13 that engages a worm wheel 14 having a shaft or arbor 14ª which is mounted in the base 1. The front end of the shaft 12 is screw-threaded to receive a nut 15 for holding a gear wheel 16 in place. A bell crank lever 18 is loosely mounted upon the front bearing 17 of the shaft 12, and one arm 19 of the same has a slot 20 therein in which is adjustably mounted an arbor 21. Two gear wheels 22 and 23 and an operating handle 24 are mounted on the arbor 21 and are held in place by a nut 25. The other arm 26 of the bell crank lever 18 has a curved slot 27 therein into which projects a stationary screw 28 that is supported by the front plate 5 and, when tightened, maintains the lever 18 in any desired position.

The worm wheel 14 has a diametral graduated slot therein for receiving a movable crank pin 29 which is retained in any desired position by a set screw 30 and engages a transverse groove 31ª in the under side of a carriage 31 that is slidably mounted upon the rails 2 and 3 and has rotatably mounted thereon an arbor 32 carrying a turn table 33 and a worm wheel 34, the latter of which is engaged and driven by the slidable worm screw 8. On each side of the carriage 31 is a bifurcated standard 35 for guiding a rod 36. The rod 36 has a pin 37 projecting therefrom that has a groove 38 in its lower end for engaging a templet 39 the periphery of which conforms to the circular or polar coördinate representation of the curve to be analyzed. The templet is attached to the center of the turn table by a nut 41 which fits the screw threaded end of the arbor 32, and two springs 40 hold the pin 37 in engagement with the periphery of the templet as the turn table rotates.

At the end of the rod 36 is a hole 42 to receive a pin that is located in one end of a planimeter 43 which has the usual vernier wheels 44 that roll upon a table 45 and integrate the area of the curve representing the harmonic being investigated.

The gear wheels 10, 16, 22 and 23 have such numbers of teeth that the carriage 31, starting at the front of the instrument, will make as many complete oscillations as is the order of the harmonic being investigated during the time that the turn table has rotated 360°, if the curve represented thereon by the templet is for one complete cycle. A complete set of gear wheels is provided for analyzing the fundamental and the harmonics to such degree as may be desired.

The rotatable table 33 has a scale of degrees 46 marked thereon, and a coöperating vernier scale 47 is attached to the carriage 31, substantially as shown.

A templet 39 of the circular or polar coordinate representation of the composite curve to be analyzed is made and is placed upon the turn table, substantially as hereinbefore described, with the carriage in its extreme front position and with the gears arranged for the correct rotation for the particular harmonic to be investigated. The operation is as follows:

The handle 24 is turned to the right and the carriage is moved toward the rear and returned to the front as many times as is the order of the harmonic, while the turn table rotates one time. As an example, if the amplitude of one quadrature component of the third harmonic is being sought, the carriage retires and advances three times while the turn table rotates once. The groove 38 in the pin 37 engages the templet 39 and the rod 36 is given motions in two directions to draw a figure, if a pencil is placed in its end, substantially as shown in Fig. 4. Then the area of this figure divided by the product of the order of the harmonic times 3.1416, multiplied by the radius of the crank pin 29, will be the amplitude of one component of the third harmonic being sought. Since the drawing of the figure and then its integration is complicated, and mistakes are liable to be made, the planimeter 43 is utilized and is inserted in the hole 42, as hereinbefore described, and the actual area of the curve which would be drawn is read from the vernier wheels 44 and the following formulae, as hereinbefore stated, is applied.

$$A_n = \frac{S_a}{n\pi R}$$

where $A_n$ = amplitude of the sine or A component of the $n$th harmonic, $S_a$ = planimeter integrated area,
$n$ = $n$th harmonic or the order of the same,
$\pi$ = 3.1416, and
$R$ = radial distance between the center of pin 29 and the center of the worm wheel 14 or one-half the throw of the carriage.

To find the B or the cosine component of the $n$th harmonic, the screw 28 is loosened and the bell crank lever 18 is rotated about its axis until the gear wheels 22 and 10 are disengaged, then the screw 28 is again tightened and the handle turned, driving the shaft 12 until the carriage moves from the front to the center of the device without rotating the turn table. Then the screw 28 is again loosened and the gears 10 and 22 again engaged and the handle is rotated as described with reference to the sine component. The carriage moves backwardly, returns to the center, then to the front and again to the center $n$ times for the $n$th harmonic while the turn table rotates one time. The amplitude of the cosine component of the $n$th harmonic is then $$B_n = \frac{S_b}{n\pi R} \text{ as before}$$

where $B_n$ = amplitude of the cosine or B component of the $n$th harmonic,
$S_b$ = area of the figure described by the point of the rod 36 or planimeter reading,
$\pi$ = 3.1416, and
$R$ = distance between the center of the worm gear 14 and the center of the pin 29 or one-half the travel of the carriage.

Thus, any curve may be analyzed to find the two quadrature components of the various harmonic waves which combine to form the composite wave being analyzed. The amplitude of the $n$th harmonic without respect to phase difference is equal to the square root of the sum of the squares of the A and B or sine and cosine components of the $n$th harmonic, or $$C_n = \sqrt{A_n^2 + B_n^2}$$

as is well known by those versed in the art, where $C_n$ = amplitude of the $n$th harmonic wave,
$A_n$ = amplitude or co-efficient of the sine component of the $n$th harmonic and
$B_n$ = amplitude or co-efficient of the cosine component of the $n$th harmonic.

Referring now particularly to Fig. 4, the proof for the determination of the sine component follows:

When the carriage starts at the bottom, it moves upward making $n$ oscillations for the $n$th harmonic while the turn table rotates one time, substantially as hereinbefore stated, the following is true for values of $y$ and $x$ or the ordinates and abscissas respectively:

$$y = R \sin\left(n\theta - \frac{\pi}{2}\right) \quad (1)$$

$$y = -R \cos n\theta \quad (2)$$

and $$x = A_1 \sin \theta + A_3 \sin 3\theta \ldots A_n \sin n\theta + B_1 \cos \theta + B_3 \cos 3\theta \ldots + B_n \cos n\theta \text{ from Fourier's series.} \quad (3)$$

then from equation (2)

$$\frac{dy}{d\theta} = nR \sin n\theta \quad (4)$$

The area of the figure traversed by the planimeter is $$S_a = \int_0^{2\pi} x\,dy = \int_0^{2\pi} f(\theta) nR \sin n\theta\, d\theta \quad (5),$$

from equation (4)

$$dy = nR \sin n\theta\, d\theta,$$

and from equation (3)

$$x = A_1 \sin \theta + \ldots A_n \sin n\theta + B_1 \cos \theta + \ldots B_n \cos n\theta,$$

therefore substituting and simplifying, the following is true.

$$S_a = \int_0^{2\pi} A_n nR (\sin^2 n\theta)\, d\theta \quad (6)$$

from which by solving and simplifying $$S_a = A_n nR\pi$$

or $$A_n = \frac{S_a}{n\pi R} \quad (7)$$

where $A_n$, $S_a$, $n\pi$ and $R$ are the same as hereinbefore stated.

With special reference to Fig. 5, the cosine or B component is obtained as follows: The carriage is started in the center and moves upward, considering $\theta$=zero at the point where the contact point touches the templet. The equations in this case for $x$ and $y$ are as follows:

$$y = R \sin n\theta \quad (1a)$$

$$x = f(\theta) = A_1 \sin \theta + A_3 \sin 3\theta + \ldots A_n \sin n\theta + B_1 \cos \theta + B_3 \cos 3\theta + \ldots + B_n \cos n\theta \quad (2a)$$

and as before the area of the figure is $$S_b = \int_0^{2\pi} x\, dy \quad (3a)$$

and from equation (1a) $dy = nR \cos n\theta\, d\theta$, then substituting in equation (3a) and simplifying terms the following is true.

$$S_b = \int_0^{2\pi} (B_n nR \cos^2 n\theta)\, d\theta \quad (4a)$$

and integrating $$S_b = B_n nR\pi \text{ or } B_n = \frac{S_b}{nR\pi} \quad (5a)$$

where $B_n$, $S_b$, $n$, $R$ and $\pi$ are the same as hereinbefore stated. Thus, from the foregoing, may be seen the proof of the hereinbefore stated formulas.

While I have described my invention in its preferred form, I desire it to be understood that structural modifications may be made which do not depart from the spirit and scope of the same as defined in the appended claims.

I claim as my invention:

1. A harmonic analyzer comprising an oscillatory member, a rotatable member mounted on the said oscillatory member and adapted to support a templet and gear wheels for oscillating the said oscillatory member a predetermined number of times while the rotatable member rotates one time.

2. A harmonic analyzer comprising an oscillatory member, a rotatable member mounted on the said oscillatory member and adapted to support a templet, gear wheels for oscillating the said oscillatory member a predetermined number of times while the rotatable member rotates one time and a tracing device actuated by the rotation of the templet and the oscillation of the oscillatory member for tracing a figure the area of which is proportional to the amplitude of one component of one harmonic of the curve represented by the said templet.

3. A harmonic analyzer comprising an oscillatory member, a rotatable member mounted on the said oscillatory member and adapted to carry a templet and a plurality of gear wheels for causing the said oscillatory member to oscillate a predetermined number of times while the rotatable member rotates one time.

4. A harmonic analyzer comprising an oscillatory member, a rotatable member mounted thereon, a templet of the composite curve to be analyzed mounted upon the said rotatable member, means for operating the said rotatable and oscillatory members and a second oscillatory member movably attached to the first oscillatory member and in operative engagement with the said templet.

5. A harmonic analyzer comprising an oscillatory member, a rotatable member mounted thereon, a polar coordinate templet of the curve to be analyzed mounted upon the said rotatable member and means adjustable to control the number of oscillations of the oscillatory member during one rotation of the said rotatable member so that the former shall be in direct proportion to the order of the harmonic being investigated.

6. A harmonic analyzer comprising a polar coördinate templet of the composite curve to be analyzed, positive actuating means for oscillating the templet a predetermined number of times while it rotates one time and means actuated by the templet for tracing a figure.

7. A harmonic analyzer comprising an oscillatory member, a rotatable member mounted on the said oscillatory member, a polar coördinate templet of the composite curve to be analyzed mounted upon the said rotatable member, means for operating the said rotatable and oscillatory members at predetermined relative speeds, a second oscillatory member movably attached to the first said oscillatory member and in operative engagement with the said templet and means operatively connected to the said second oscillatory member for measuring the area of the figure traced by the same.

8. A harmonic analyzer comprising an oscillatory member, a rotatable member mounted thereon, a polar coördinate templet of the composite curve to be analyzed mounted upon the said rotatable member, means for operating the said rotatable and oscillatory members at predetermined relative speeds, a second oscillatory member movably attached to the first oscillatory member, means for retaining the same in operative engagement with the said templet, and means operated by the said second oscillatory member for measuring the area of the figure traced by the same.

9. A harmonic analyzer comprising an oscillatory member, a rotatable member mounted on the said oscillatory member, a templet of the composite curve to be analyzed mounted upon the said rotatable member, means for operating the said rotatable and oscillatory members at predetermined relative speeds, a second oscillatory member movably attached to the first oscillatory member, means for retaining the same in operative engagement with the said templet and a planimeter operated by the said second oscillatory member.

10. A harmonic analyzer comprising an oscillatory carriage, a rotatable table mounted upon the said carriage, gear wheels for oscillating the said carriage a predetermined number of times while the said table rotates one time and a rod movably attached to the said carriage and adapted to oscillate when the said carriage oscillates.

11. A harmonic analyzer comprising an oscillatory carriage, a rotatable table mounted upon the said carriage, gear wheels for oscillating the said carriage a predetermined number of times while the said table rotates one time, a templet representing the curve to be analyzed and attached to the said table, a rod operatively attached to the said carriage and relatively movable with respect thereto and resilient means for retaining said rod in engagement with the said templet.

12. In a harmonic analyzer, the combination with a templet of a composite curve to be analyzed, of means for oscillating the said templet a predetermined number of times while it rotates one time, and a tracing arm actuated by the said templet when it is oscillated and rotated to describe a figure that is a measure of one component of one harmonic of the curve represented by the templet.

13. A harmonic analyzer comprising a templet of a curve to be analyzed, means for oscillating the templet a predetermined number of times while it rotates one time and means restrained in engagement with the templet for tracing a figure when the templet is oscillated and rotated.

14. A harmonic analyzer comprising a templet of a curve to be analyzed, gear wheels for oscillating the templet a predetermined number of times while it rotates one time and means actuated by the templet for tracing a figure when the templet is oscillated and rotated.

15. A harmonic analyzer comprising a templet of a curve to be analyzed, gear wheels for oscillating the templet a predetermined number of times while it rotates one time and a planimeter actuated by the templet to integrate the area of a figure that is the measure of one component of the curve represented by the templet.

16. A harmonic analyzer comprising an oscillating member, means for oscillating the oscillating member a predetermined number of times and for simultaneously rotating a templet of the composite curve to be analyzed one time, and a tracing arm adapted to be engaged by the templet when it is rotated for movement thereby to trace a figure.

17. A harmonic analyzer comprising an oscillating member, means for oscillating the oscillating member a predetermined number of times and for simultaneously rotating a templet of the composite curve to be analyzed one time, and a tracing arm for so engaging the templet as to be actuated thereby when the templet is rotated and said arm coöperating with the said oscillating member to describe a figure the area of which is a measure of one component of one harmonic of the curve represented by the templet.

18. A harmonic analyzer comprising an oscillating member, a rotatable member adapted to carry a templet of the composite curve to be analyzed, means for causing the said oscillatory member to oscillate a predetermined number of times and for simultaneously rotating the rotatable member one time, and means actuated by the templet and the oscillating member for describing a figure.

19. A harmonic analyzer comprising an oscillating member, a rotatable member adapted to carry a templet, means for causing the said oscillatory member to oscillate a predetermined number of times while the rotatable member rotates one time, and means adapted to engage the templet and to coöperate with the rotatable and the oscillatory members for tracing a figure.

20. A harmonic analyzer comprising an oscillatory member, a rotatable member adapted to actuate a templet, means for causing the said oscillatory member to oscillate a predetermined number of times while the rotatable member is actuated one time, and means dependent upon the actuation of the templet and the oscillation of the oscillatory member for describing a figure.

21. A harmonic analyzer comprising an oscillatory member, a rotatable member adapted to actuate a templet, means for causing the said oscillatory member to oscillate a predetermined number of times while the rotatable member is actuated one time, means dependent upon the actuation of the templet and the oscillation of the oscillatory member for describing a figure, and means for measuring the area of the figure.

22. A harmonic analyzer comprising an oscillatory member, a rotatable member adapted to actuate a templet of the curve to be analyzed, means for causing the said oscillatory member to oscillate a predetermined number of times while the rotatable member is actuated one time, and means dependent upon the actuation of the templet and the oscillation of the oscillatory member for integrating a value that is a measure of one component of one harmonic of the curve represented by the templet.

23. A harmonic analyzer comprising means adapted to move with a simple harmonic motion, means actuated by a templet of the curve to be analyzed and adapted to move with a rectilinear motion at right angles to the line of motion of the first mentioned means, and means actuated by the two said means for describing a figure.

24. A harmonic analyzer comprising means adapted to move with a simple harmonic motion, means actuated by a templet of the curve to be analyzed and adapted to move with a rectilinear motion at right angles to the line of motion of the first mentioned means, and means dependent upon the motion of the two said means for integrating a value that is a measure of one component of one harmonic of the curve represented by the templet.

In testimony whereof I have hereunto subscribed my name this 29th day of Dec., 1913.

LEWIS W. CHUBB.

Witnesses:
 D. W. A. OETTING,
 B. B. HINES.